US011932247B2

(12) United States Patent
Aikawa

(10) Patent No.: US 11,932,247 B2
(45) Date of Patent: Mar. 19, 2024

(54) DRIVING ASSISTANCE CONTROL DEVICE OF VEHICLE HAVING VEHICLE SPEED AND ACCELERATION CONTROL BASED ON PRECEDING VEHICLE INFORMATION AND ROAD TOPOLOGY

(71) Applicant: Toyota Jidosha Kabushiki Kaisha, Toyota (JP)

(72) Inventor: Hiroki Aikawa, Atsugi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 135 days.

(21) Appl. No.: 17/317,193

(22) Filed: May 11, 2021

(65) Prior Publication Data

US 2022/0017089 A1 Jan. 20, 2022

(30) Foreign Application Priority Data

Jul. 16, 2020 (JP) .................................. 2020-122472

(51) Int. Cl.
*B60W 30/165* (2020.01)
*B60W 30/14* (2006.01)
*G08G 1/16* (2006.01)

(52) U.S. Cl.
CPC ....... *B60W 30/146* (2013.01); *B60W 2552/15* (2020.02); *B60W 2554/4041* (2020.02); *B60W 2720/10* (2013.01)

(58) Field of Classification Search
CPC ....... B60W 30/146; B60W 2554/4041; B60W 2552/15; B60W 2720/10
See application file for complete search history.

(56) References Cited

U.S. PATENT DOCUMENTS

| 2007/0005218 | A1* | 1/2007 | Ueyama | B60W 30/16 701/96 |
| 2013/0080019 | A1* | 3/2013 | Isaji | B60W 30/16 701/96 |
| 2016/0070000 | A1* | 3/2016 | Takasuka | G01S 17/931 356/5.01 |
| 2017/0001639 | A1* | 1/2017 | Dempsey | G08G 1/16 |
| 2017/0203758 | A1* | 7/2017 | Mukai | B60W 30/09 |
| 2018/0043793 | A1* | 2/2018 | Herb | B60L 15/2045 |
| 2018/0057003 | A1* | 3/2018 | Hyun | B60W 40/06 |
| 2018/0307236 | A1* | 10/2018 | Reed | G05D 1/0223 |
| 2019/0061527 | A1* | 2/2019 | Hassani | B60W 30/16 |
| 2021/0001850 | A1* | 1/2021 | Shamshiri | B60W 30/16 |
| 2021/0018614 | A1* | 1/2021 | Yang | B60W 30/16 |
| 2021/0086771 | A1* | 3/2021 | Horiguchi | B60W 30/143 |
| 2021/0245749 | A1* | 8/2021 | Ross | B60W 30/165 |

FOREIGN PATENT DOCUMENTS

JP 11291789 A 10/1999
JP 2009-018727 A 1/2009

* cited by examiner

*Primary Examiner* — Jess Whittington
*Assistant Examiner* — Rami Nabih Bedewi
(74) *Attorney, Agent, or Firm* — Dinsmore & Shohl LLP

(57) ABSTRACT

A device according to the present disclosure is configured to, when it is determined that the road on which a vehicle travels is an uphill road and the speed of the vehicle is controlled such that the vehicle follows a preceding vehicle, in a case where the preceding vehicle is no longer detected, inhibit the acceleration of the vehicle or decelerate the vehicle until it is determined that the road on which the vehicle travels is no longer the uphill road, or alternatively, until a certain period of time elapses.

6 Claims, 4 Drawing Sheets

DRIVING ASSISTANCE CONTROL DEVICE OF VEHICLE HAVING VEHICLE SPEED AND ACCELERATION CONTROL BASED ON PRECEDING VEHICLE INFORMATION AND ROAD TOPOLOGY

CROSS-REFERENCE TO RELATED APPLICATION

This application claims priority to Japanese Patent Application No. 2020-122472 filed on Jul. 16, 2020, incorporated herein by reference in its entirety.

BACKGROUND

1. Technical Field

The present disclosure relates to a driving assistance control device for a vehicle (such as an automobile), and more specifically, a driving assistance control device which executes adaptive cruise control (ACC).

2. Description of Related Art

As one example of a vehicle driving assistance system, a configuration called "ACC" has been suggested and implemented in various ways. This system basically executes constant speed control in which a vehicle speed is automatically controlled based on a value set by a driver, and when a preceding vehicle is present, inter-vehicle distance control or follow-up control is executed with a suitable inter-vehicle distance to the preceding vehicle by detecting the preceding vehicle by utilizing a detection unit such as a radar or a camera. For example, Japanese Unexamined Patent Application Publication No. 2009-18727 discloses an ACC configuration in which, in a case where the preceding vehicle leaves a lane in which the subject vehicle travels during the follow-up control in which the vehicle follows the preceding vehicle, the subject vehicle shifts to the constant speed control with a vehicle speed set by the driver after the vehicle speed when the subject vehicle had followed the preceding vehicle has been maintained for a certain period of time after the preceding vehicle is lost, thereby preparing for when the preceding vehicle enters the lane again.

SUMMARY

When the subject vehicle (vehicle) follows the preceding vehicle on an uphill road, the preceding vehicle passes a peak of the uphill road (end point of the uphill road) and enters a road beyond the peak of the uphill road (opposite side of the peak of the uphill road from the subject vehicle), and thus the preceding vehicle is not visible from the subject vehicle. Therefore, the driver of the subject vehicle cannot see the preceding vehicle. In such a case, how the preceding vehicle is traveling on the road beyond the peak of the uphill road is unknown, for example, whether it maintains the same vehicle speed or it decelerates due to a vehicle ahead of the preceding vehicle or an obstacle. Hence, it is desirable that the subject vehicle inhibits the acceleration or slowly decelerates such that the vehicle speed is not excessive and thus the vehicle does not approach the preceding vehicle too closely. This situation is the same when the ACC is executed in the vehicle. In a case where the vehicle follows the preceding vehicle by utilizing the inter-vehicle distance control or the follow-up control on the uphill road, when the preceding vehicle passes the peak of the uphill road and is not detected by the vehicle, the acceleration is inhibited or slowly decelerated. However, conventional ACC is usually configured such that, while the inter-vehicle distance control or the follow-up control is executed in which the preceding vehicle is detected and the subject vehicle follows such a preceding vehicle, when the preceding vehicle is not detected, the inter-vehicle distance control or the follow-up control is terminated in order to execute the constant speed control in which the subject vehicle is accelerated such that the vehicle speed increases up to a set value. Therefore, ACC should be improved or modified such that, when the vehicle follows the preceding vehicle on the uphill road and the preceding vehicle passes the peak of the uphill road, the acceleration is inhibited or the vehicle is slowly decelerated.

Accordingly, with the present disclosure, it is possible to improve or modify a driving assistance control device of a vehicle, which executes the ACC, such that, in a case where inter-vehicle distance control or follow-up control is executed and a vehicle follows the preceding vehicle on the uphill road, when the preceding vehicle passes a peak of the uphill road and is not detected from the vehicle, the vehicle is controlled so as not to approach the preceding vehicle too closely at a high speed.

A driving assistance control device of a vehicle, according to the present disclosure, includes a setting vehicle speed acquisition unit configured to acquire a setting vehicle speed set by a driver, a preceding vehicle detection unit configured to detect a preceding vehicle on a route of the vehicle, an uphill road determination unit configured to determine whether a road on which the vehicle travels is an uphill road, and a vehicle speed control unit configured to control the vehicle such that the speed of the vehicle matches the setting vehicle speed when the preceding vehicle is not detected, and control the vehicle speed such that the vehicle follows the preceding vehicle when the preceding vehicle is detected. The vehicle speed control unit controls the vehicle, when it is determined that the road on which the vehicle travels is the uphill road and the speed of the vehicle is controlled such that the vehicle follows the preceding vehicle, in a case where the preceding vehicle is no longer detected, such that acceleration of the vehicle is inhibited until it is determined that the road on which the vehicle travels is no longer the uphill road, or alternatively, until a certain period of time elapses.

In such a configuration stated above, the "setting vehicle speed acquisition unit" may be a unit that allows the driver to refer to the setting vehicle speed that is set to a desired speed by the driver in any aspect. The "preceding vehicle detection unit" may be a unit capable of detecting whether the preceding vehicle exists on the route of the vehicle, i.e., whether the preceding vehicle travels on a road which is ahead in a traveling direction of the vehicle, and a distance from the vehicle to the preceding vehicle, with any method, based on information obtained by utilizing any sensor device that can detect a presence and a location of an object around the vehicle, such as a millimeter-wave radar, LIDAR, or a camera. The "uphill road determination unit" may be any unit capable of detecting whether the road on which the vehicle travels is the uphill road, and, for example, may detect whether the road on which the vehicle travels is the uphill road by matching map information with a location of the vehicle (obtained by a detected value of a G-sensor, a measured value of a wheel speed sensor, and a GPS device) or using information around the vehicle obtained from an image captured by a camera. The "vehicle speed control unit" stated above basically may have an ACC configuration, that is, a configuration in which the vehicle is controlled such that the vehicle speed matches the setting vehicle speed when the preceding vehicle is not detected, and the vehicle speed is controlled such that the vehicle follows the preceding vehicle when the preceding vehicle is detected. Typically, the vehicle speed control unit controls the vehicle speed such that, when the vehicle follows the detected preceding vehicle and the preceding vehicle travels at a speed lower than the setting vehicle speed, the vehicle (subject vehicle) travels behind the preceding vehicle at the same vehicle speed as that of the preceding vehicle while keeping a suitably set inter-vehicle distance. Therefore, when the speed of the preceding vehicle is higher than the setting vehicle speed, the speed of the vehicle may be controlled so as to match the setting vehicle speed. Moreover, when the preceding vehicle is detected and the speed of the vehicle (subject vehicle) is higher than that of the preceding vehicle, the vehicle (subject vehicle) is decelerated such that its vehicle speed matches the speed of the preceding vehicle, thereby maintaining the inter-vehicle distance. "Inhibition of acceleration" may mean that the acceleration is prohibited or the acceleration is reduced more than usual.

In the device according to the present embodiment, the vehicle speed control unit may be configured to inhibit acceleration of the vehicle when it is determined that the road on which the vehicle travels is the uphill road and when controlling the speed of the vehicle such that the vehicle follows the preceding vehicle, in a case where the preceding vehicle is no longer detected, until it is determined that the road on which the vehicle travels is no longer the uphill road, or alternatively, until the certain period of time elapses. With such a configuration, when the vehicle speed is controlled such that the vehicle (subject vehicle) follows the preceding vehicle on the uphill road by the ACC, the preceding vehicle passes the peak of the uphill road and enters the road beyond the peak of the uphill road, and thus the preceding vehicle is no longer visible from the subject vehicle and cannot be detected from the subject vehicle. In a conventional configuration, the follow-up control is terminated and the vehicle is accelerated until its speed reaches the setting vehicle speed. However, according to the present embodiment, the acceleration of the vehicle is inhibited. Consequently, even if the preceding vehicle slows down or stops at the peak of the uphill road, it is possible to prevent the vehicle from inadvertently approaching the preceding vehicle at a high speed, thereby providing favorable driving assistance. Moreover, in order to more reliably prevent the vehicle from approaching the preceding vehicle too closely, when the preceding vehicle is no longer detected in the situation stated above, the vehicle speed control unit may decelerate the vehicle.

In the configuration of the device according to the present embodiment described above, when the vehicle reaches the peak of the uphill road after the preceding vehicle is no longer detected, if the preceding vehicle is located such that the vehicle should follow the preceding vehicle, the preceding vehicle can be detected by the preceding vehicle detection unit again and the vehicle may be controlled so as to follow the preceding vehicle. Therefore, the control in which the acceleration is inhibited or the vehicle is decelerated when the preceding vehicle is no longer detected may be terminated. Moreover, in a case where the certain period of time has elapsed after the preceding vehicle is no longer detected, the likelihood of the vehicle inadvertently approaching the preceding vehicle too closely decreases. Therefore, the control in which the acceleration is inhibited or the vehicle is decelerated may be terminated. Alternatively, the inhibited acceleration or the deceleration may be terminated when it is determined that the road on which the vehicle travels is no longer the uphill road or when the certain period of time has elapsed.

Further, in the configuration stated above, in a case where the vehicle is decelerated when the preceding vehicle is not detected while the vehicle travels on the uphill road, a magnitude of deceleration applied to the vehicle may be larger when the uphill road has a steep incline, as compared with when the uphill road has a gentle incline. The reasons for this will be described hereinbelow. When the uphill road has a gentle (small) incline, the road beyond the peak of the uphill road is visible from the vehicle even though the vehicle is relatively far from the peak of the uphill road. Thus, in a case where the preceding vehicle passes the peak of the uphill road and is not detected by the vehicle in a situation in which the vehicle follows the preceding vehicle as stated above, a distance from the vehicle to the preceding vehicle is relatively long. Moreover, in a case where the preceding vehicle can be detected by the vehicle again when the vehicle approaches but is still relatively far from the peak of the uphill road, or alternatively, in a case where the vehicle reaches the peak of the uphill road and the preceding vehicle can be detected on the road beyond the peak of the uphill road, the preceding vehicle travels at a considerable distance away from the vehicle. Therefore, when the uphill road has a gentle incline, the distance from the vehicle to the preceding vehicle is relatively long, or it takes a relatively long time to detect the preceding vehicle again, thus the vehicle does not have to be rapidly decelerated. On the other hand, when the uphill road has a steep (large) incline, the road beyond the peak of the uphill road cannot be seen by the vehicle unless the vehicle is very close to or reaches the peak of the uphill road. In a case where the preceding vehicle passes the peak of the uphill road and is not detected by the vehicle in a situation in which the vehicle follows the preceding vehicle as stated above, the vehicle is near the peak of the uphill road. Sometimes the distance from the vehicle to the preceding vehicle may be relatively short. Therefore, when the uphill road has a steep incline, in a case where the preceding vehicle is no longer detected, it may take a relatively short time to detect the preceding vehicle again. Furthermore, when the vehicle reaches the peak of the uphill road, the preceding vehicle may be traveling at a relatively short distance from the peak of the uphill road. Thus, the vehicle speed is reduced as soon as possible after the preceding vehicle is no longer detected. As stated above, in the device according to the present embodiment, the vehicle speed control unit may control the vehicle, in a case where the vehicle is decelerated and when the uphill road has a steep incline, such that the magnitude of deceleration applied to the vehicle is large as compared with when the uphill road has a gentler incline. In the device of the present embodiment, an uphill incline acquisition unit may be provided in order to acquire information on a degree of an incline of the uphill road.

In the configuration stated above, when it is determined that the road on which the vehicle travels is the uphill road and the vehicle speed is controlled such that the vehicle follows the preceding vehicle, in a case where the preceding vehicle is no longer detected because the preceding vehicle passes the peak of the uphill road and changes lanes, and is not obscured by the uphill road, the vehicle does not need to inhibit the acceleration or be decelerated in order to prevent the vehicle from approaching the preceding vehicle too closely at a high speed as stated above. However, when the road beyond the peak of the uphill road cannot be seen from the vehicle when the preceding vehicle is no longer detected because it changes lanes and the vehicle travels relatively near the peak of the uphill road, the vehicle reaches the peak of the uphill road while the acceleration is inhibited or the vehicle is decelerated, without executing the vehicle speed control for traveling at the setting vehicle speed.

Therefore, in the configuration of the device according to the present embodiment stated above, the vehicle speed control unit may control the vehicle, when it is determined that the road on which the vehicle travels is the uphill road and the speed of the vehicle is controlled such that the vehicle follows the preceding vehicle, in a case where the preceding vehicle is no longer detected on the route of the vehicle because it changes lanes and the peak of the uphill road is detected to be within the predetermined distance of the vehicle, such that the acceleration of the vehicle is inhibited or the vehicle is decelerated. Consequently, in the device of the present embodiment, when it is determined that the road on which the vehicle travels is the uphill road, the uphill peak detection unit may be provided to detect the peak of the uphill road. The "predetermined distance" herein is a distance at which the vehicle is considered to travel near the peak of the uphill road, and may be optionally and suitably set. The predetermined distance may be set to be a sufficient distance such that the vehicle can reach the peak of the uphill road at a reasonable vehicle speed while inhibiting the acceleration or decelerating. The peak of the uphill road may be detected by matching map information with a location of the vehicle (obtained by the GPS device) or using information around the vehicle which is obtained from the image captured by the camera.

On the other hand, when the preceding vehicle is not detected on the route of the vehicle because it changes lanes, if the distance from the vehicle to the peak of the uphill road is not short, the vehicle does not need to inhibit the acceleration or be decelerated in order to prevent the vehicle from approaching the preceding vehicle too closely at a high speed. Thus, the vehicle may be controlled such that it travels at the setting vehicle speed. In this case, the vehicle speed control unit may be configured to allow the vehicle to be accelerated. Accordingly, as the vehicle is rapidly accelerated so as to drive at the setting vehicle speed, the driver and the occupants can feel comfortable while traveling in the vehicle.

In the device according to the present embodiment stated above, the driving assistance control device of the vehicle, which executes the ACC, is characterized in that, in a case where the inter-vehicle distance control or the follow-up control is executed and the vehicle follows the preceding vehicle on the uphill road, when the preceding vehicle passes the peak of the uphill road and is no longer visible from the vehicle, instead of immediately accelerating to the setting vehicle speed, the acceleration is inhibited such that the vehicle does not reach the peak of the uphill road at a high speed, the same as when the driver drives the vehicle in his/her normal manner. Accordingly, even if the vehicle reaches the peak of the uphill road and the preceding vehicle is located relatively close to the vehicle on the road beyond the peak of the uphill road, it is possible to control the vehicle such that it does not approach the preceding vehicle too closely at a high speed, whereby a safer ACC is provided.

Other objects and advantages of the present disclosure will be apparent from the following description of embodiments of the present disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Configuration of Vehicle

Figure 1A:
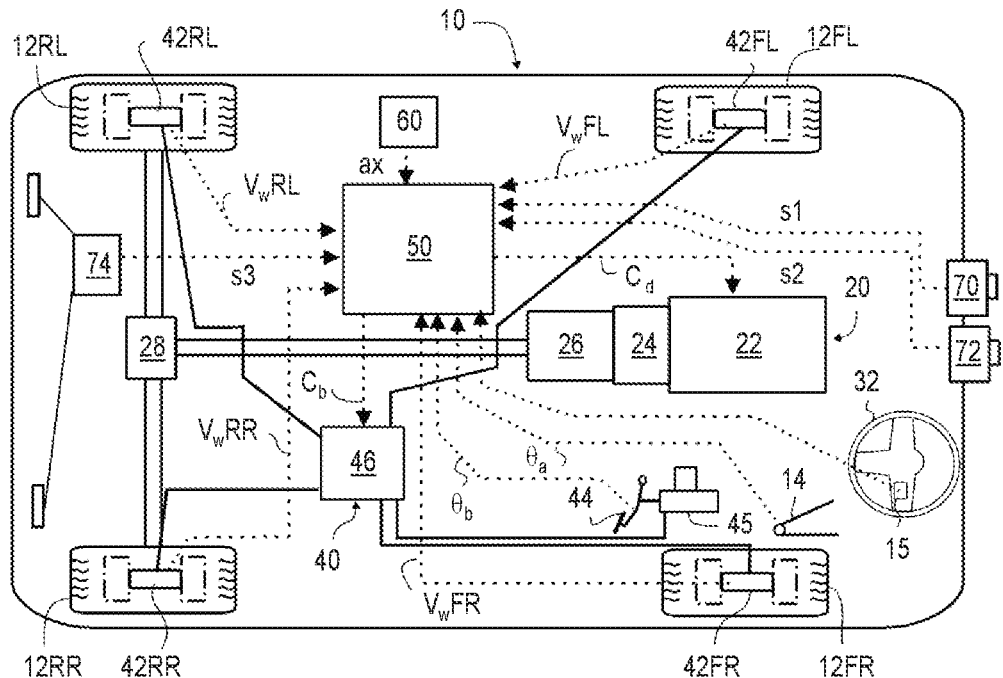
FIG. 1A is a schematic view illustrating a vehicle equipped with an example of a vehicle driving assistance control device according to the present embodiment.

Referring to FIG. 1A, a vehicle 10, which is an automobile equipped with one of the examples of the driving assistance control device according to the present embodiment, generally includes left and right front wheels 12FL and 12FR, left and right rear wheels 12RL and 12RR, a driving device 20 which generates a driving force for each wheel (only for the rear wheels in the example shown in FIG. 1A, since it is a rear-wheel-drive vehicle), a steering device (only a steering wheel 32 is shown) that controls a steering angle of the wheels, and a braking device 40 that generates a braking force for each wheel. The driving device 20 is usually configured such that, in response to an accelerator pedal 14 pressed by the driver, drive torque or rotational force is transmitted to the rear wheels 12RL and 12RR from an engine and/or an electric motor 22 (a hybrid driving device having both the engine and the electric motor is also allowed) via, for example, a torque converter 24, a transmission 26, and a differential gear device 28. As the steering device, a power steering device may be employed, by which rotation of the steering wheel 32 operated by the driver is transmitted to tie rods (not shown) so as to steer the front wheels 12FL and 12FR. The braking device 40 is an electronically controlled hydraulic braking device, in which a braking pressure, i.e., a braking force in a wheel cylinder 42$i$ (i=FL, FR, RL, RR; the same applies below), equipped on each wheel is adjusted by a hydraulic circuit 46 communicated with a master cylinder 45, which is operated in response to a brake pedal 44 pressed by the driver. The hydraulic circuit 46 is generally configured such that each of the wheel cylinders may be optionally provided with various valves (master cylinder cut valve, hydraulic holding valve, or reducing valve) which communicate with the master cylinder, oil pump, and oil reserver (not shown). In normal mode, the pressure of the master cylinder 45 is respectively supplied to each wheel cylinder 42$i$ in response to the pressed brake pedal 44. Furthermore, the braking device 40 may be a device which pneumatically or electromagnetically applies the braking force to each wheel, or may be a device designated by those skilled in the art.

Further, the vehicle 10, equipped with the driving assistance control device of the present embodiment, is provided with an in-vehicle camera 70 or a radar device 72 for monitoring a situation around the vehicle, by which the preceding vehicle and other various objects can be recognized, in order to detect whether there is the preceding vehicle, as well as a distance to the preceding vehicle. The vehicle 10 may be further provided with a GPS device (car navigation system) 74, which acquires various pieces of information, including surrounding environment and location information, via communication with GPS satellite blocks.

Then, the driving assistance control device of the present embodiment executes "ACC" as driving support, as will be described in more detail later. The ACC is configured such that the constant speed control is basically executed in which the vehicle speed is automatically controlled based on a value set by the driver without operating the accelerator pedal, and especially when the preceding vehicle is present, the inter-vehicle distance control or the follow-up control is executed with a suitable inter-vehicle distance to the preceding vehicle by detecting the preceding vehicle by utilizing a detection unit such as a radar or a camera. Therefore, in such a control, the driving device 20 and the braking device 40 are operated to accelerate, decelerate, or maintain the vehicle speed under the control of an electronic control device 50 (computer).

The electronic control device 50 may include a computer and a drive circuit having a CPU, ROM, RAM, and an input/output port device, which are connected to each other by a bidirectional common bus in a standard form. Configurations and operations of components consisting of the driving assistance control device of the present embodiment, which will be described hereinbelow, may be implemented by the operations of the electronic control device 50 according to a program. The electronic control device 50 acquires detected values from various sensors, which are used as parameters for the driving assistance control of the present embodiment, implemented by the examples described hereinbelow, e.g., information s1 to s3 obtained from an in-vehicle camera 70, a radar device 72, and a GPS device 74, wheel speed $V_{wi}$ (i=FL, FR, RL, RR), longitudinal acceleration ax (from a longitudinal G-sensor 60), an amount $\theta_a$ of operating or pressing the accelerator pedal 14, and an amount $\theta_b$ of pressing the brake pedal. Based on these acquired values, the electronic control device 50 outputs, to the corresponding devices, a control command cd to the driving device 20 for generating the driving force to accelerate the vehicle, and a control command $c_b$ to the braking device 40 for generating the braking force to decelerate the vehicle. Furthermore, the electronic control device 50 is configured such that a vehicle speed setting switch 15 that receives an instruction to execute ACC from the driver is mounted on the steering wheel 32, and a signal from the switch 15 is input to the electronic control device 50. The vehicle speed setting switch 15 is set to be turned on when the vehicle speed reaches a value at which the driver wishes to drive at a constant speed by the ACC, such that the vehicle speed at that time is considered as the setting vehicle speed, and the ACC may be initiated (the setting vehicle speed may be changed by buttons operated by the driver after it is set). Furthermore, although not shown, various parameters required for various controls to be executed in the vehicle of the present embodiment (e.g. various detected signals such as steering angle, yaw rate, or lateral acceleration) may be input, and then various control commands may be output to corresponding devices.

Configuration of Device

Figure 1B:
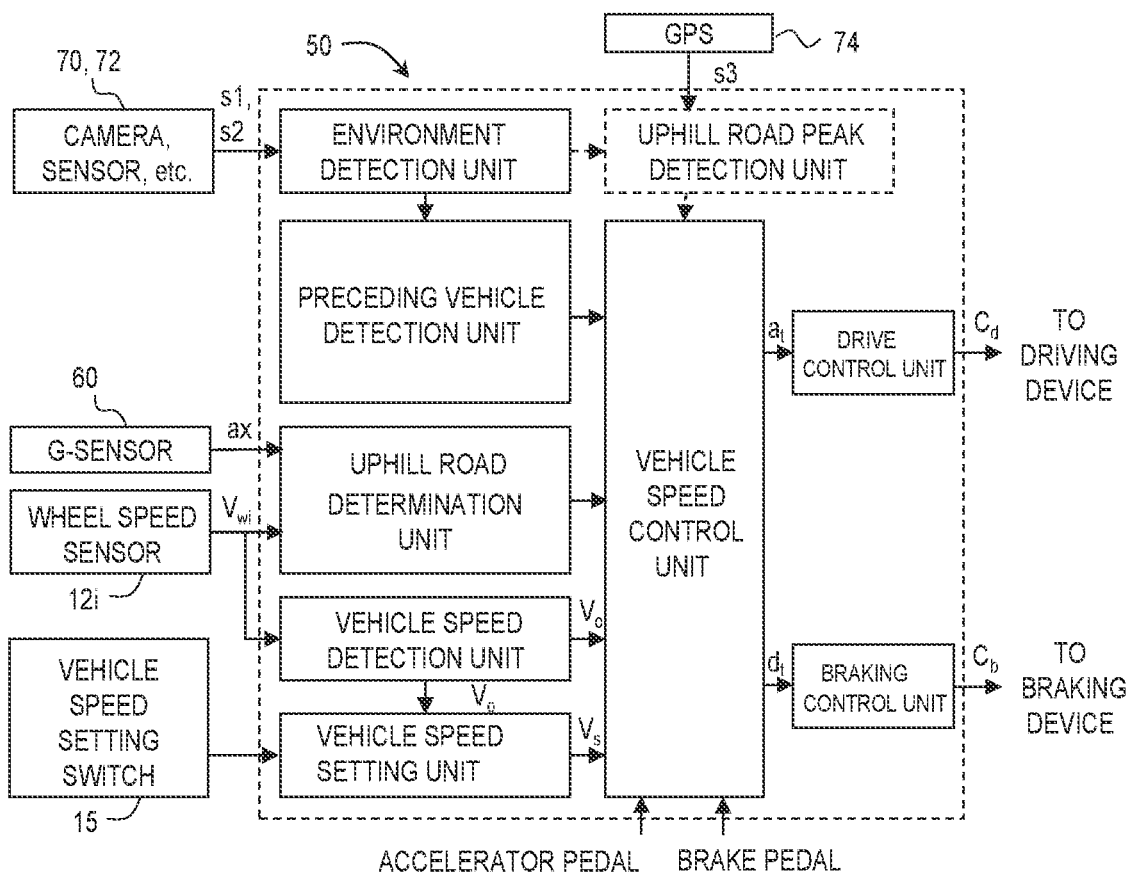
FIG. 1B is a diagram illustrating a configuration of a system in one of the examples of the vehicle driving assistance control device according to the present embodiment in a form of a block diagram.

Referring to FIG. 1B, the driving assistance control device according to the present embodiment may be configured by, generally, an environment detection unit, a preceding vehicle detection unit, an uphill road determination unit, a vehicle speed detection unit, a vehicle speed setting unit, a vehicle speed control unit, a drive control unit, and a braking control unit. The environment detection unit receives, for example, an image of the camera 70 or a detected value of the radar device 72, and recognizes, in any manner, situations around the vehicle, and more specifically, the preceding vehicle, other objects, white centerlines, and yellow lines on the road. The preceding vehicle detection unit determines whether there is the preceding vehicle on the route of the vehicle based on the detected information obtained by the environment detection unit. When there is the preceding vehicle, a distance to the preceding vehicle or a speed of the preceding vehicle may be detected. The uphill road determination unit detects whether a road on which the vehicle travels is the uphill road based on, for example, the longitudinal acceleration ax detected by the longitudinal G-sensor 60 and the wheel speed $V_{wi}$ detected by the wheel speed sensors mounted on the wheels, or alternatively, an incline of the road may be further detected. The uphill road determination unit may determine whether the road is the uphill road, or may detect the incline of the road, by matching the map information with the location information obtained by the GPS device 74. The vehicle speed detection unit is configured to determine a vehicle speed Vo by an optional algorithm based on the wheel speed $V_{wi}$ detected by the wheel speed sensors mounted on the wheels or the information obtained by the GPS device. The vehicle speed setting unit sets a setting vehicle speed $V_s$ to be maintained in the constant speed control by the ACC. The setting vehicle speed may be set in any manner, for example, it may be set to the vehicle speed Vo when the vehicle speed setting switch 15 is operated by the driver.

When the vehicle speed setting switch 15 is operated by the driver, the vehicle speed control unit determines acceleration $a_t$ or deceleration $d_t$ referring to the setting vehicle speed $V_s$ and the vehicle speed Vo such that the vehicle speed Vo is maintained at the setting vehicle speed $V_s$, and then transmits same to the drive control unit or the braking control unit, as the constant speed control by the ACC. In addition, when the preceding vehicle is detected by referring to the information from the preceding vehicle detection unit, the vehicle speed control unit determines the acceleration $a_t$ or the deceleration $d_t$ and transmits same to the drive control unit or the braking control unit, in order to adjust the vehicle speed such that the vehicle follows the preceding vehicle while keeping a suitable inter-vehicle distance, as the follow-up control or the inter-vehicle distance control by the ACC. Thus, the drive control unit and the braking control unit respectively operate the driving device 20 and the braking device 40 such that the vehicle speed Vo is maintained at the setting vehicle speed $V_s$ or is adjusted to follow the preceding vehicle without an operation of the accelerator pedal or the brake pedal by the driver to achieve the acceleration $a_t$ or the deceleration $d_t$. In the device of the present embodiment, information on whether the road on which the vehicle travels is the uphill road, or information on the incline of the road, is input to the vehicle speed control unit from the uphill road determination unit, as described later, when the vehicle is controlled so as to follow the preceding vehicle on the uphill road and then the preceding vehicle is no longer detected, the inhibition of the acceleration/deceleration process is executed depending on the situation, instead of the constant speed control being immediately executed.

Furthermore, the device of the present embodiment may be provided with an uphill road peak detection unit, which detects a peak of the uphill road in front of the vehicle, i.e., an end point of the uphill road while traveling on the uphill road, and transmits such information to the vehicle speed control unit. The peak of the uphill road is detected by, for example, matching the map information with the location information obtained by the GPS device 74, or alternatively, detecting a point at which the road, the while centerline, or the yellow line cannot be detected in front of the vehicle with reference to the detected information obtained from the environment detection unit. The vehicle speed control unit may change a vehicle speed control mode when the preceding vehicle is no longer detected while the vehicle is controlled so as to follow the preceding vehicle on the uphill road, according to the location of the peak of the uphill road.

The information on the pressed accelerator pedal and brake pedal may also be input to the vehicle speed control unit. The ACC may be configured to be terminated when it is detected that the accelerator pedal or the brake pedal is pressed when the ACC is executed.

Operations of Device (1) When the Vehicle Stops Following the Preceding Vehicle on the Uphill Road The driving assistance control device of the present embodiment is generally configured to execute the ACC, which controls the vehicle such that the speed of the vehicle matches the setting vehicle speed when the preceding vehicle is not detected, and controls the vehicle speed such that the vehicle follows the preceding vehicle when the preceding vehicle is detected. However, herein, the control configuration when the preceding vehicle is no longer detected while the control is executed such that the vehicle follows the preceding vehicle on the uphill road (inter-vehicle distance control or follow-up control) is improved or modified.

Figure 2A:
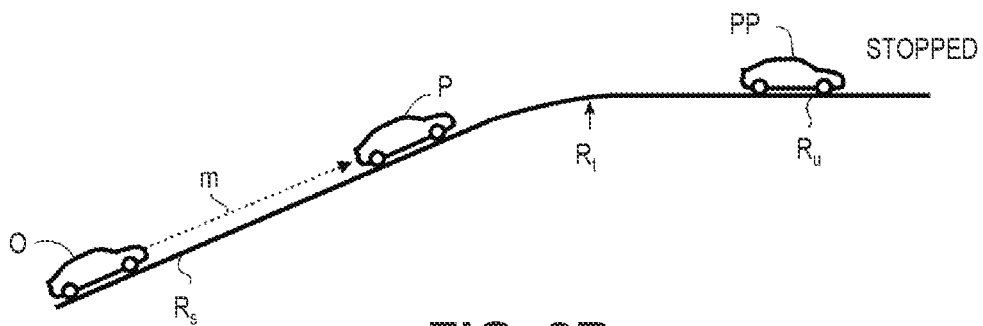
FIG. 2A is a diagram schematically illustrating a state in which a vehicle (subject vehicle) O follows a preceding vehicle P on an uphill road, respectively, and a state where the preceding vehicle P followed by the vehicle O does not yet reach a peak of the uphill road.
Figure 2B:
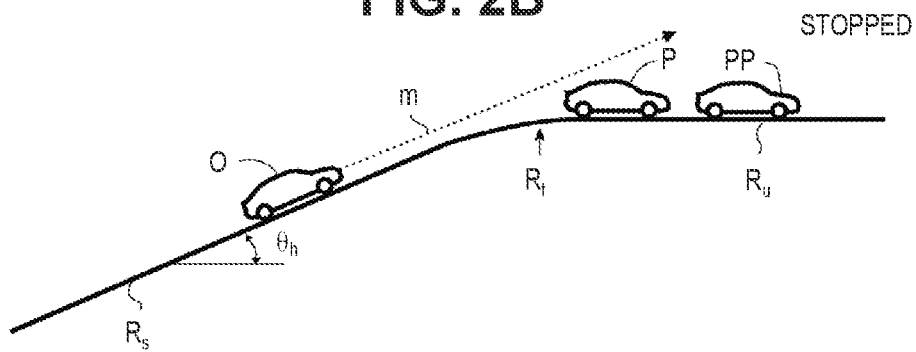
FIG. 2B is a diagram schematically illustrating a state where the preceding vehicle P followed by the vehicle O reaches the peak of the uphill road and then decelerates or stops behind a vehicle ahead of the preceding vehicle PP.

Specifically, referring to FIG. 2A, when the vehicle (subject vehicle) 0 is controlled so as to follow the preceding vehicle P on an uphill road $R_s$, the normal ACC is executed. As stated above, the vehicle speed is controlled such that the vehicle O follows an image of the preceding vehicle P within a detection range m of the camera or the radar device while maintaining an inter-vehicle distance from the preceding vehicle P which is not too short (generally the vehicle speed is controlled so as to match the speed of the preceding vehicle). As shown in FIG. 2B, when the preceding vehicle P passes a peak $R_t$ of the uphill road, the preceding vehicle P is no longer visible from the vehicle O and is not within the detection range m of the vehicle O, whereby the image of the preceding vehicle P is no longer detected from the vehicle O. In such a case, a conventional ACC causes the vehicle to be accelerated in order to execute the constant speed control in which the vehicle speed is set to the setting vehicle speed $V_s$, since the preceding vehicle P is no longer detected. However, when the preceding vehicle P decelerates or stops due to traffic congestion or due to a vehicle ahead of the preceding vehicle PP after passing the peak $R_t$ of the uphill road, if the vehicle O accelerates as stated above, it may get too close to the preceding vehicle P while traveling at a high speed. Therefore, in the device of the present embodiment, as described above, when the preceding vehicle P is no longer visible from the vehicle after passing the peak $R_t$ of the uphill road and is no longer detected, the inhibition of the acceleration or deceleration process is executed so as to prevent the vehicle from approaching the preceding vehicle P at a high speed.

In the configuration stated above, it is determined that the preceding vehicle P is no longer visible from the vehicle after passing the peak $R_t$ of the uphill road and is no longer detected, by detecting that the preceding vehicle P is not detected due to a reason other than the preceding vehicle P changing lanes. Therefore, in the actual control processing, it may be determined that the preceding vehicle is no longer detected and that the preceding vehicle has not changed lanes.

(2) Inhibition of Acceleration/Deceleration Process

In the inhibition of the acceleration/deceleration process, executed in a case where the preceding vehicle is not detected due to a reason other than the preceding vehicle changing lanes, the vehicle may be controlled such that the vehicle speed is maintained at the same value as when the preceding vehicle is no longer detected, as one example. In such a case, since gravity acts so as to move the vehicle backward on the uphill road, the driving force may be applied to offset gravity. In another example, the driving force may not be applied such that the vehicle is decelerated by gravity, or alternatively, the braking force may be applied to increase the deceleration.

Figure 2C:
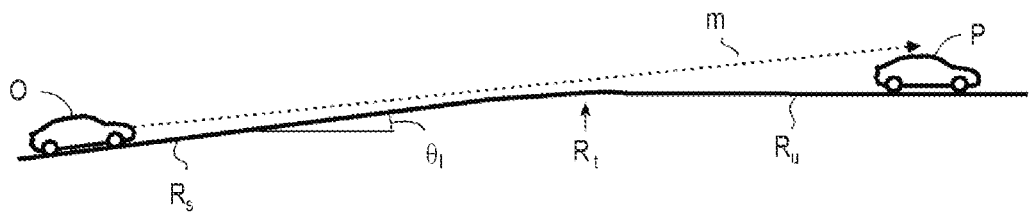
FIG. 2C is a diagram schematically illustrating a state where the preceding vehicle P followed by the vehicle O reaches the peak of the uphill road which has a gentler incline than those in the cases of FIGS. 2A and 2B.
Figure 3:
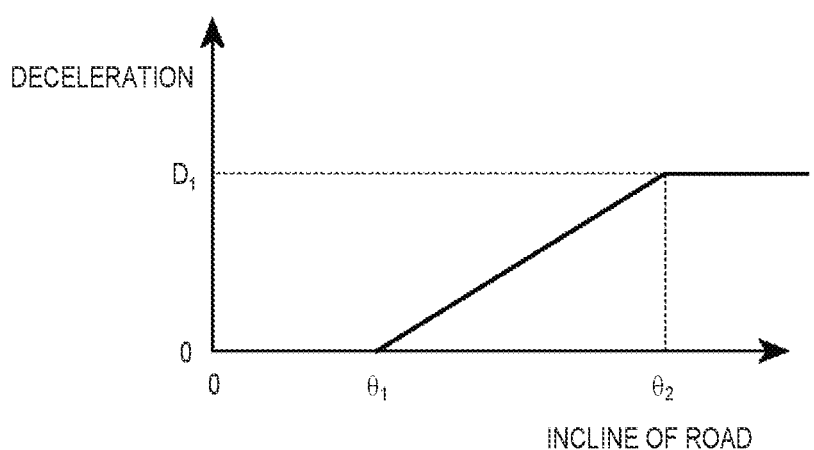
FIG. 3 is a diagram illustrating, in the vehicle driving assistance control device of the present embodiment, when the vehicle follows the preceding vehicle on the uphill road and executes inter-vehicle distance control, a magnitude of deceleration according to incline of road applied to the vehicle upon an inhibition of an acceleration/deceleration process executed in a case where the preceding vehicle is not detected due to a reason other than changing lanes, in a form of a graph.

As another example, a magnitude of the deceleration may be changed according to the incline of the uphill road. As can be understood by comparing FIGS. 2B and 2C, when the uphill road $R_s$ has a steep incline (FIG. 2C; incline $\theta_l$), as compared to when the uphill road $R_s$ has a steep incline (incline $\theta_h > \theta_l$), the vehicle O can detect the preceding vehicle P passing the peak $R_t$ of the uphill road even when the preceding vehicle P is located relatively far away from the peak $R_t$ of the uphill road. When the preceding vehicle P travels further away from the peak $R_t$ of the uphill road, the preceding vehicle P is not detected from the vehicle O. Therefore, when the preceding vehicle P is not detected from the vehicle O in a case where the uphill road $R_s$ has a gentle incline, it means that the distance between the vehicle O and the preceding vehicle P is relatively long, thus it is less likely that the vehicle O approaches the preceding vehicle P too closely even if the vehicle O is not decelerated with a large amount of deceleration. On the other hand, when the uphill road $R_s$ has a steep incline (FIG. 2B; incline $\theta_h$), even if the vehicle O is relatively close to the preceding vehicle P, the preceding vehicle P may not be detected from the vehicle O. In such a case, in order to more reliably prevent the vehicle O from approaching the preceding vehicle P at a high speed, the vehicle speed is decreased with a larger amount of deceleration before the vehicle O reaches the peak $R_t$ of the uphill road. Accordingly, in the configuration stated above, in a case where the inhibition of the acceleration/deceleration process is executed in response to a case where the preceding vehicle is not detected due to a reason other than the preceding vehicle changing lanes, the magnitude of deceleration applied to the vehicle may be larger when the uphill road has a steeper incline, as compared with when the uphill road has a gentler incline. Specifically, as shown in FIG. 3, the deceleration may be set to increase when the incline θ of the road exceeds a predetermined value $θ_t$. In the operations, the braking force may be applied in addition to gravity such that deceleration is generated as shown in the drawings.

(3) When the Preceding Vehicle is No Longer Detected Because it Changes Lanes

Figure 4A:
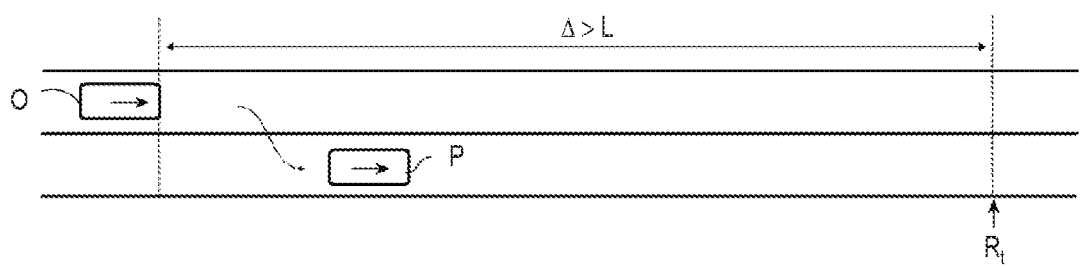
FIG. 4A is a diagram illustrating, in the vehicle driving assistance control device of the present embodiment, when the vehicle follows the preceding vehicle on the uphill road and executes inter-vehicle distance control, a case where the preceding vehicle is not detected because it changes lanes.
Figure 4B:
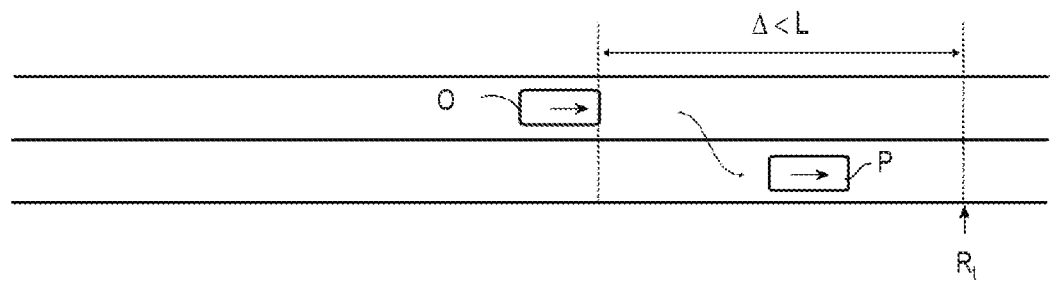
FIG. 4B is a diagram illustrating, in the vehicle driving assistance control device of the present embodiment, when the vehicle follows the preceding vehicle on the uphill road and executes inter-vehicle distance control, a case where the preceding vehicle is not detected because it changes lanes.

In the configuration of the device of the present embodiment described above, if the preceding vehicle cannot be detected in front of the vehicle because it changes lanes while the vehicle follows the preceding vehicle on the uphill road, the vehicle does not approach the preceding vehicle too closely as shown in FIG. 2B, and thus the vehicle may be accelerated until it reaches the constant speed control in which the vehicle speed is adjusted to the setting vehicle speed $V_s$, as in a conventional ACC. Actually, shifting to the constant speed control in which the vehicle speed is adjusted to the setting vehicle speed $V_s$ is also in line with the intention of the driver who has set the constant speed. However, it is difficult to see the road beyond the peak of the uphill road from the vehicle traveling on the uphill road, thus it is useful that the vehicle does not reach the peak of the uphill road at a high speed. In the device of the present embodiment, when the preceding vehicle changes lanes while the vehicle is controlled such that the vehicle follows the preceding vehicle on the uphill road, and the distance to the peak of the uphill road is less than the predetermined distance Δ, the inhibition of the acceleration/deceleration process may be executed in the same manner as described above. Specifically, as shown schematically in FIG. 4A, in a case where a distance L between the vehicle O and the peak $R_t$ of the uphill road is longer than the predetermined distance Δ when the preceding vehicle changes lanes, the vehicle may be accelerated until it reaches the constant speed control in which the vehicle speed is adjusted to the setting vehicle speed $V_s$. On the other hand, as schematically shown in FIG. 4B, in a case where the distance L between the vehicle O and the peak $R_t$ of the uphill road is shorter than the predetermined distance Δ when the preceding vehicle changes lanes, the inhibition of the acceleration/deceleration process may be executed in the same manner as in a case where the preceding vehicle P is no longer detected as the preceding vehicle P passes the peak $R_t$ of the uphill road and then is no longer visible from the vehicle. The predetermined distance Δ may be optionally and suitably set. For example, it may be a distance at which the vehicle can be reasonably decelerated to a suitable vehicle speed until the vehicle reaches the peak $R_t$ of the uphill road when the vehicle reaches the peak $R_t$ of the uphill road.

(4) Process Procedure of the Device

Figure 5:
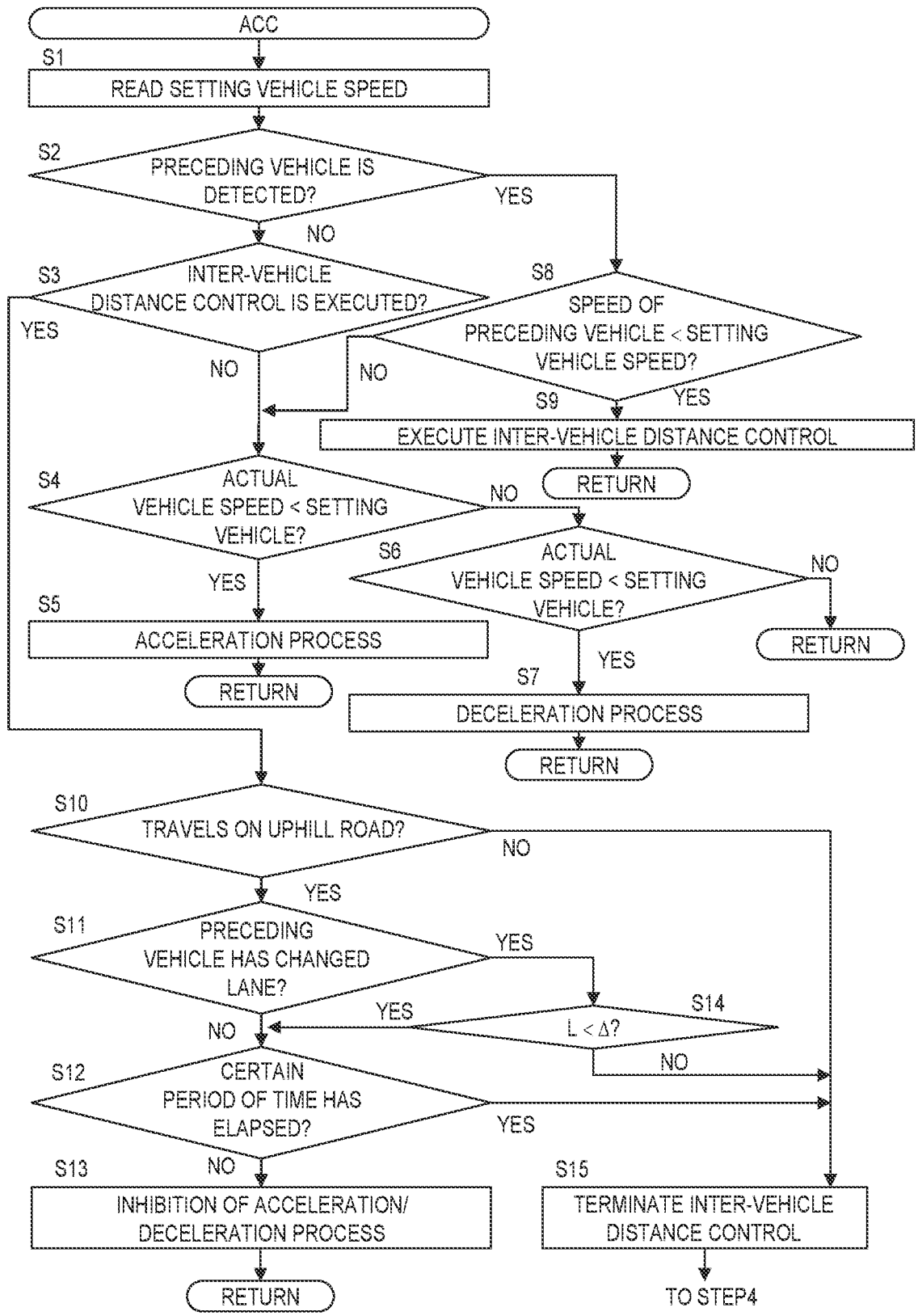
FIG. 5 is a diagram illustrating an operation of the vehicle driving assistance control device of the present embodiment when the ACC is executed in a form of a flowchart.

As described above, the ACC in the driving assistance control device of the present embodiment is initiated, for example, with the setting vehicle speed being a speed when the driver turns the vehicle speed setting switch 15 on after the actual vehicle speed reaches a value at which the driver wishes to execute the constant speed control by the ACC (after the ACC is initiated, the setting vehicle speed may be changed as the driver operates the buttons or the like). Referring to FIG. 5, the specific process procedure after the ACC is initiated may be configured as follows.

In the process, the setting vehicle speed is read (step 1), and it is determined whether the preceding vehicle is detected (step 2). When the preceding vehicle is not detected and the vehicle does not follow the preceding vehicle (inter-vehicle distance control, described later) (step 3), the actual vehicle speed is adjusted to the setting vehicle speed (constant speed control). In particular, when the actual vehicle speed is lower than the setting vehicle speed (step 4), the acceleration process is executed (step 5). When the acceleration is instructed to the drive control unit, and the drive control unit transmits the control command cd to the driving device, and thereby the vehicle is accelerated and the actual vehicle speed is higher than the setting vehicle speed (step 6), the deceleration process is executed (step 7). The deceleration is instructed to the braking control unit, and the braking control unit transmits the control command $c_b$ to the braking device so as to brake the vehicle.

When the actual vehicle speed is adjusted to the setting vehicle speed as stated above, in a case where the preceding vehicle is detected in front of the vehicle (step 2), it is determined whether the speed of the preceding vehicle is lower than the setting vehicle speed by referring to the speed of the preceding vehicle (step 8). When the speed of the preceding vehicle is not lower than the setting vehicle speed, the actual speed of the vehicle O is continuously adjusted to the setting vehicle speed. On the other hand, when the speed of the preceding vehicle is lower than the setting vehicle speed, the inter-vehicle distance control is executed so as to control the vehicle speed such that the vehicle follows the preceding vehicle while keeping a suitable inter-vehicle distance from the preceding vehicle (step 9). The inter-vehicle distance control may be executed in the same manner as in the normal ACC mode, and the speed of the vehicle may be adjusted such that the inter-vehicle distance with the preceding vehicle is maintained at a suitable distance and the speed of the vehicle matches the speed of the preceding vehicle.

Thus, when the preceding vehicle in front of the vehicle is no longer detected while the process cycle is repeated while the inter-vehicle distance control or the follow-up control is executed, the device of the present embodiment executes different controls depending on whether the vehicle travels on the uphill road and whether the preceding vehicle is no longer detected because it changes lanes, as stated above. Specifically, when the inter-vehicle distance control is executed but the preceding vehicle is no longer detected ("NO" in step 2 and "YES" in step 3), it is determined whether the road on which the vehicle travels is the uphill road (step 10). The determination as to whether the road on which the vehicle travels is the uphill road may be performed in any manner, for example, as mentioned above, the acceleration value detected by the longitudinal G-sensor is compared with the acceleration value calculated from the wheel speed obtained by the wheel speed sensor. If the former is larger, it may be determined that the vehicle is traveling on the uphill road. Alternatively, whether the road that the vehicle is traveling on is uphill load may be determined by calculating the incline of the road. If the incline of the road facing the front of the vehicle is positive, it is considered to be the uphill road. Furthermore, it may be determined that the road on which the vehicle travels is the uphill road when the current location information is acquired from the GPS device and matched with the map information and then it is discovered that the vehicle is currently located on the uphill road. If the road on which the vehicle travels is not the uphill road, it means that the preceding vehicle is not detected due to a reason other than a case where the preceding vehicle passes the peak of the uphill road and no longer visible from the vehicle. Therefore, the inter-vehicle distance control may be terminated (step 15) and the vehicle may return to the constant speed control such that the vehicle is accelerated until the vehicle speed reaches the setting vehicle speed (step 4).

Meanwhile, when it is determined that the road on which the vehicle travels is the uphill road, it is determined whether the preceding vehicle has changed lanes (step 11). Such a determination can be performed, for example, by recognizing whether the image of the preceding vehicle is displaced in a lateral direction and no longer detected. When it is determined that the preceding vehicle has not changed lanes, the reason why the preceding vehicle is no longer detected can be understood to be that the preceding vehicle passes the peak of the uphill road and is no longer visible from the vehicle. Thus, as stated above, the inhibition of the acceleration/deceleration process is executed such that the vehicle does not approach the preceding vehicle at a high speed on the road beyond the peak of the uphill road (step 13). As described above, the inhibition of the acceleration/deceleration process may be terminated when the vehicle finishes traveling on the uphill road (step 10) or when the certain period of time has elapsed (step 12). At this time, the inter-vehicle distance control may be terminated (step 15) and the constant speed control may be returned. However, when the vehicle reaches the peak of the uphill road and the preceding vehicle is detected in front of the vehicle, the processes of step 8 and subsequent steps are executed.

In the configuration stated above, when the preceding vehicle has changed lanes (step 11), different controls may be executed depending on the distance L from the vehicle at the time the vehicle reaches the peak of the uphill road, as described above. If the distance L from the vehicle to the peak of the uphill road is shorter than the predetermined distance Δ (step 14), the inhibition of the acceleration/deceleration process may be executed (step 13) until the vehicle finishes traveling on the uphill road (step 10) or until the certain period of time has elapsed (step 12), in the same manner as a case where the preceding vehicle passes the peak of the uphill road and is no longer visible from the vehicle. On the other hand, when the distance L from the vehicle to the peak of the uphill road is longer than the predetermined distance Δ (step 14), it takes a certain period of time for the vehicle to reach the peak of the uphill road, such that the inter-vehicle distance control may be terminated (step 15) and the constant speed control may be executed again.

The processes by the ACC mentioned above may be terminated by overriding operations of the driver, for example, when the driver presses the accelerator pedal or the brake pedal, or turns the steering wheel to change the steering angle.

Thus, as described above, when the preceding vehicle passes the peak of the uphill road and is no longer visible from the vehicle while the vehicle executes the inter-vehicle distance control to follow the preceding vehicle on the uphill road, it is expected that the vehicle can be prevented from approaching the preceding vehicle too closely at a high speed as the inhibition of the acceleration or deceleration process is executed, even if the preceding vehicle stops or decelerates at the peak of the uphill road.

Although the descriptions above have been made in connection with the embodiments of the present disclosure, improvements and modifications can be easily made by those skilled in the art. The present disclosure is not limited to the embodiments exemplified above. It will be appreciated that the present disclosure encompasses various devices without departing from the gist of the present disclosure

What is claimed is:

1. A driving assistance control device of a vehicle, the driving assistance control device comprising an electronic control device configured to:
   acquire a setting vehicle speed set by a driver;
   detect a preceding vehicle on a route of the vehicle;
   determine whether a road on which the vehicle travels is an uphill road;
   detect a peak of the uphill road when it is determined that the road on which the vehicle travels is the uphill road;
   when the preceding vehicle is not detected, control a speed of the vehicle such that the speed matches the setting vehicle speed, and when the preceding vehicle is detected, control the speed of the vehicle such that the vehicle follows the preceding vehicle by maintaining a specified inter-vehicle distance; and
   when it is determined that the road on which the vehicle travels is the uphill road and when controlling the speed of the vehicle such that the vehicle follows the preceding vehicle;
   in a case where the preceding vehicle is no longer detected, decelerate the vehicle to a reduced speed until it is determined that the road on which the vehicle travels is no longer the uphill road, or until a certain period of time elapses, wherein a magnitude of deceleration of the vehicle is changed according to an incline of the uphill road;
   in a case where the preceding vehicle changes lanes and is no longer detected on the route of the vehicle and the peak of the uphill road is detected to be within a predetermined distance of the vehicle, inhibit the acceleration of the vehicle or decelerate the vehicle; and
   in a case where the preceding vehicle changes lanes and is no longer detected on the route of the vehicle and the peak of the uphill road is not detected to be within the predetermined distance of the vehicle, permit the acceleration of the vehicle.

2. The driving assistance control device according to claim 1, wherein the electronic control unit is further configured to:
   acquire information on a degree of an incline of the uphill road; and
   in a case where the vehicle is decelerated, when the uphill road has a first incline, increase the magnitude of deceleration applied to the vehicle as compared with when the uphill road has a second incline that is less steep than the first incline.

3. The driving assistance control device according to claim 1, wherein the electronic control unit is further configured to detect the incline of the uphill road by matching map information with location information obtained by a GPS device.

4. The driving assistance control device according to claim 1, wherein the electronic control unit is further configured to determine the speed of the vehicle based on a wheel speed detected by wheel speed sensors.

5. The driving assistance control device according to claim 1, wherein the electronic control unit is further configured to detect the peak of the uphill road by matching map information with location information obtained by a GPS device.

6. The driving assistance control device according to claim 1, wherein the electronic control unit is further configured to detect the peak of the uphill road by detecting a point at which the uphill road, a white center line, or a yellow line cannot be detected in front of the vehicle.

\* \* \* \* \*